J. E. COGAN.
PHOROMETER.
APPLICATION FILED APR. 18, 1908.
938,463.
Patented Nov. 2, 1909.
2 SHEETS—SHEET 2.
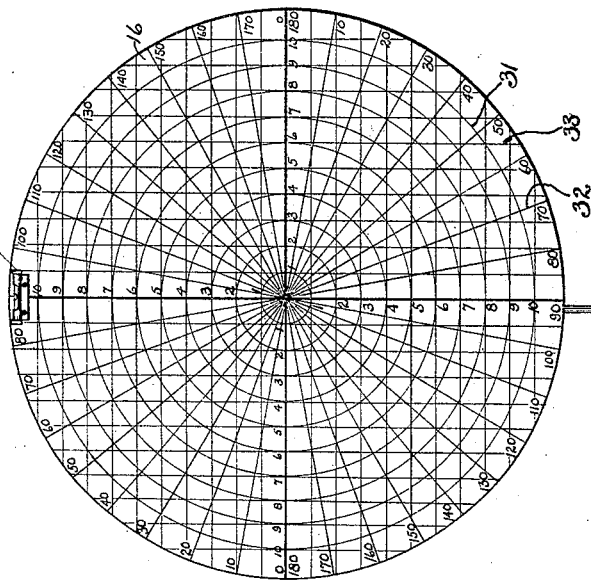
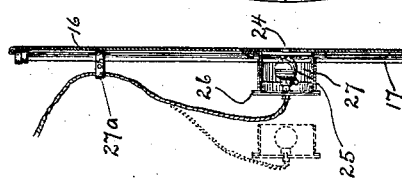
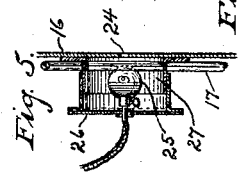
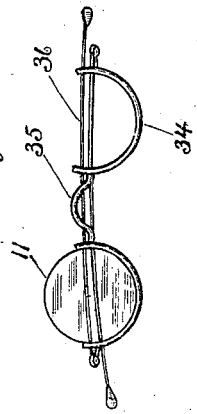
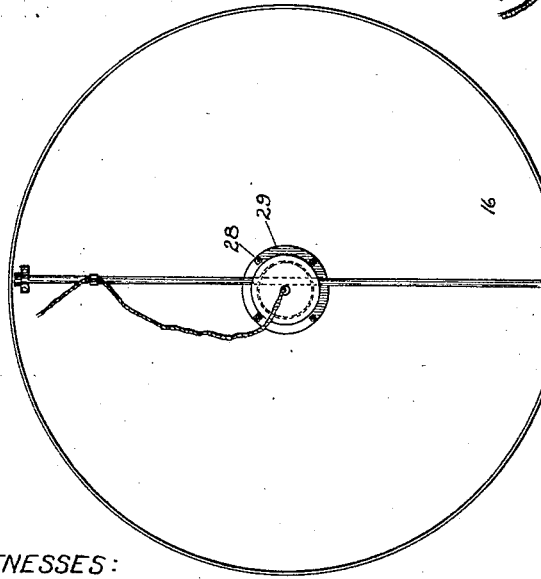
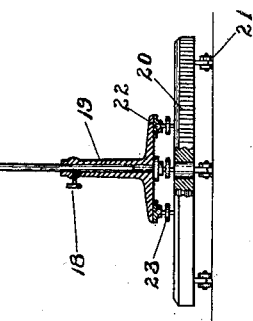
WITNESSES:
Rav Criss
Catherine Zwilling
INVENTOR
James E. Cogan
BY
Brockett & Kwis
ATTORNEYS

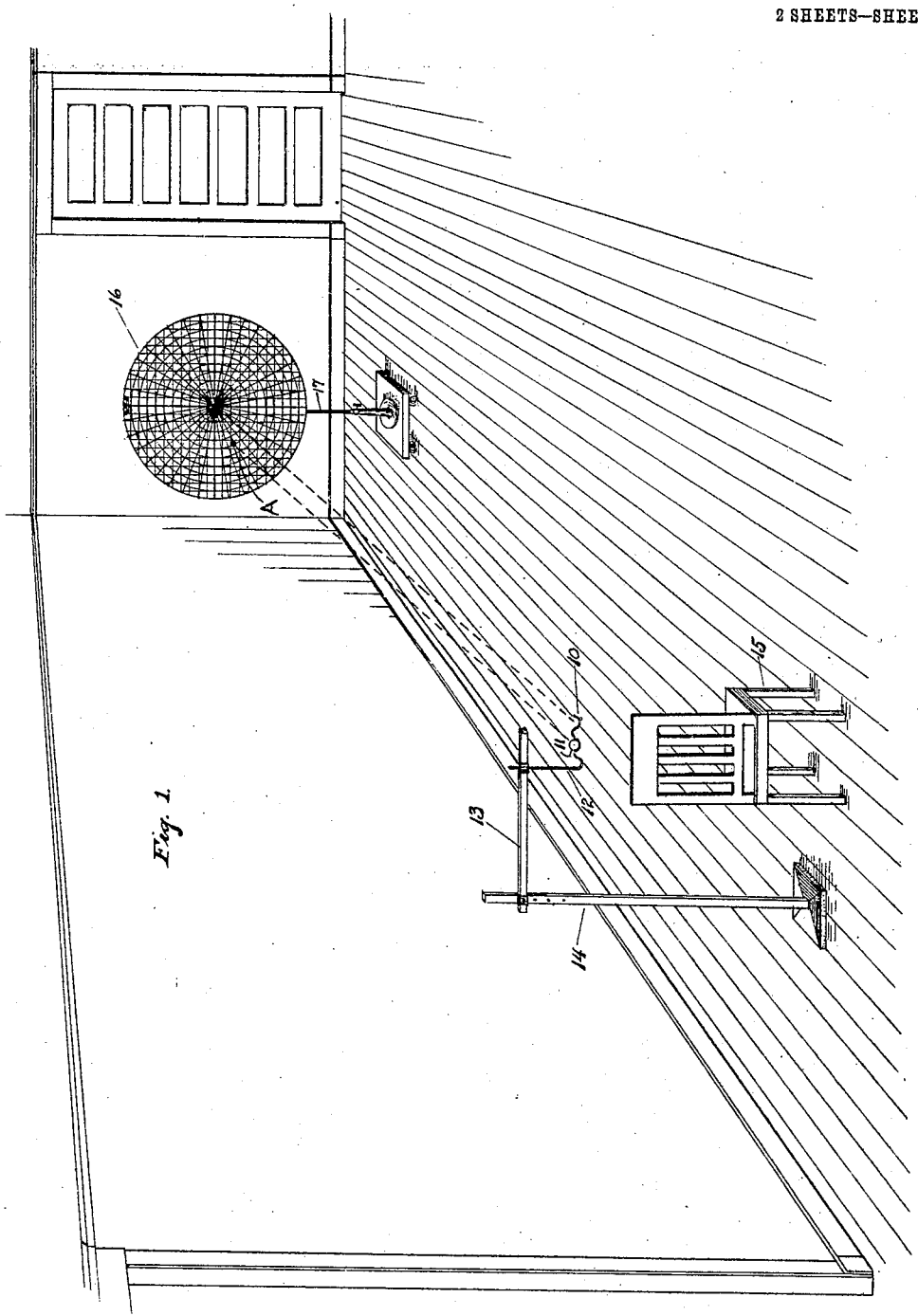

UNITED STATES PATENT OFFICE.

JAMES E. COGAN, OF CLEVELAND, OHIO.

PHOROMETER.

938,463.  Specification of Letters Patent.  Patented Nov. 2, 1909.

Application filed April 18, 1908. Serial No. 427,960.

*To all whom it may concern:*

Be it known that I, JAMES E. COGAN, a citizen of the United States, residing at Cleveland, in the county of Cuyahoga and State of Ohio, have invented certain new and useful Improvements in Phorometers, of which the following is a specification.

This invention relates to phorometers or apparatus for testing the external muscles of the eyes to determine the latent muscular deviations.

The present invention has for its object the provision of a simple apparatus by means of which the exact condition of the external muscles can be easily, quickly and accurately determined and in such a manner that the operator can judge positively which muscles should be exercised to eliminate the abnormal condition, or the axes and strength of relief prisms which should be used.

In carrying out my invention I do away with the lenses which are usually employed and which are the greatest sources of error and employ in combination with a device such as a cobalt glass for permitting the eyes to assume a position of rest, a suitably marked chart located a fixed distance from the patient, upon which chart the exact relative positions of the images produced when the eyes are at rest and hence the exact condition of the muscles of the eyes can be at once determined. The chart which is preferably in the form of a disk has a small centrally located aperture behind which is a source of light, the aperture and light behind the same forming a luminous spot toward which the patient directs his eyes. If the external muscles of the eyes are in normal condition the images of the aperture will overlap or coincide, but if the muscles are in an abnormal condition the image produced by the eye before which the cobalt glass is placed will be displaced from the image produced by the other eye an amount and in a direction depending upon the muscular conditions or latent deviations. The chart is provided with suitable markings and designations including preferably circles drawn about the aperture as a center and which preferably have radii in terms of light displacement effects produced by standard prisms, and radial lines emanating from the center, by means of which the amount and direction of displacement of one image with respect to the other can be readily determined. The chart may also be provided with tangent lines by means of which the lateral and vertical deviations in addition to the actual deviation may be easily determined.

My invention still further consists of certain novel details of construction and combination and arrangement of parts which will be described in the specification and set forth in the appended claims.

For a better understanding of my invention reference is had to the accompanying drawings in which—

Figure 1 is a perspective view illustrating the relation or relative position of the parts of the apparatus when in use, and showing the same somewhat conventionally; Fig. 2 is an enlarged detail front view of the chart; Fig. 3 is a rear view of the same; Fig. 4 is a vertical sectional view taken through the center, the lower portion being removed; Fig. 5 is an enlarged central detail view of the chart; and Fig. 6 is a view of a simple form of holder for a glass to be placed before one of the eyes so as to permit the eyes to assume a position of rest or of greatest ease when viewing the luminous aperture in the chart.

In carrying out my invention any preferred form and construction of parts may be employed, but in the drawing I have shown an embodiment which meets the necessary requirements very effectively.

Referring first to Fig. 1 of the drawing it will be seen that the testing apparatus consists principally of two parts, a device for permitting the eyes to assume a position of rest so that the involuntary tendency for the eyes to turn to cause the images to blend or fuse is overcome, thus producing a double image effect, and second, a chart which is located a definite distance from the patient and on which the readings are made, as will be explained.

To permit the eyes to assume a position of rest or of greatest ease, I prefer to employ a glass having plane surfaces and of such a color that when the glass is placed before one of the eyes and the patient looks at an object such as a luminous spot with the naked eye and through the glass with the other eye two images will be produced of such radically different colors that the normal tendency for the eyes to turn so as to cause the images to blend is overcome, and the eyes assume a position of rest or of greatest ease. I prefer to employ for this purpose a cobalt glass which answers the requirement very effectively. Any other similar device however may be employed as long as it produces the desired effect. The cobalt glass or similar devices may be supported before the patient's eye in any suitable manner, but in Fig. 1 a holder is provided with two half round frames 10, either one of which may receive the cobalt glass 11, the frames being connected together and being supported for the purpose of illustration by an arm 12 secured to a horizontal arm 13, adjustably mounted upon a standard 14. The frames will be at such a height that when the patient is sitting in a chair 15 they will be directly in front of his eyes.

At a definite distance from the patient and from the device just described is a chart 16 which, in this case, is in the form of a disk, preferably made of sheet metal. The disk is mounted upon a rod 17 which is secured to the back thereof and is adjustably secured by a thumb screw 18 in the socket of a standard 19 supported upon a base 20 provided with casters 21. The standard may be adjusted upon the base 20 in any suitable manner, but in this case it rests upon spherical heads 22 of adjustable screws 23 threaded into the base. The disk is provided with a small centrally located aperture 24 behind which is a source of light forming a small luminous spot, which is viewed by the patient when the tests are being made. In this instance, the source of light is an incandescent electric lamp 25, which is supported by a tubular cap 26 which engages a tubular flange 27 secured to the rear of the disk with the aperture centrally thereof, by means of screws 28 passing through a rim or flange 29 and the disk. The electric conductors are preferably supported in some manner as by a clip 27ª so that the lamp and its holder will not be accidentally pulled out of place. I have provided at the top of the disk a small level 30, the use of which will be explained later. When the patient views the aperture in the disk with the cobalt glass placed before one of the eyes he will see two distinct images and if the eyes are in abnormal condition the image produced by the eye before which is placed cobalt glass will appear to be displaced in a certain direction and a certain extent from the center of the disk or with respect to the aperture seen with the naked eye, the location of the displaced image depending upon the extent of the latent deviations or the abnormal muscular condition. In order that this image may be located on the chart and the condition of the muscles of the eyes determined at once, I have provided on the face of the disk the following markings and designations. The disk is provided with a number of concentric circles 31 drawn about the aperture as a center, the circles being an equal distance apart and being numbered consecutively, with radial lines 32 spaced, in this case, 10 degrees apart and designated, and with horizontal and vertical lines 33 tangent to the circles. In order that the conditions of the eyes may be measured in terms of known standards of measurement I prefer that the radii of the circles be in terms of the displacement effects of standard prism diopters when located from the disk the same distance as the patient's eyes when viewing the latter. For example, the radius of the inner circle will be equal to the light displacement produced by a one degree prism diopter. The radius of the second circle will be equal to the displacement produced by a two degree prism diopter, and so forth for the remaining circles. I prefer that the chart be placed five meters from the patient, in which case the radius of the inner circle will be five centimeters and the difference between the radii of the successive circles will be five centimeters. The circles and radial lines or meridians will be sufficient to accurately locate on the chart the apparently displaced image and to determine the muscular deviations, but I prefer also to have the tangent lines, for by means of the latter the ordinate and abscissa of any point with respect to the center of the disk as an axis, or in other words the lateral and vertical deviations (the components of the actual deviation) can be approximately determined at a glance.

In Fig. 6 I have shown a simple supporting member for the cobalt glass or other similar device which is used for permitting the eyes to assume a position of rest while the test is being made. This member is in the nature of a pair of spectacles having a pair of approximately half round frames or sockets 34 in either one of which the glass 11 may be placed and which are connected together by a nose bridging member 35 and may be supported in position before the eyes by means of hinged temples 36.

The manner of using the apparatus above described will now be explained more fully. The frame which is supported on the wall or any other suitable way as shown in Fig. 1 will be adjusted in height so as to be properly located with respect to the eyes of the patient when seated on the chair 15, also the rod 17 carrying the disk will be adjusted in the socket of the standard 19 until the centrally located aperture is in line with the eyes of the patient. In case the floor is not level the disk can be adjusted by the screws 23 so that the plane of the disk will be at right angles to the line of vision and the two main diameters at right angles to each other, will be respectively horizontal and vertical, the latter condition being accurately determined by means of the level 30.

The cobalt glass will then be placed in one of the holders or sockets of the supporting frame and the patient will look with both eyes at the aperture in the center of the disk which aperture, when the light is on, appears to be a luminous spot. On account of the color of the glass which is placed before one of the eyes, two images will be produced, each of which will be distinct from the other. The color of one image being so radically different from the color of the other, the tendency of the eyes to fuse or blend the images is overcome and the external muscles of the eyes, which may normally be under stress relax so to speak, and permit the eyes to assume a position of rest. If the muscles are in abnormal condition the colored image will be displaced from the other image and will appear to be located upon the chart at some point, such as A, in Fig. 1, the dotted lines in Fig. 1 indicating the apparent lines of vision. The quadrant in which the image A will appear to be located, and its distance from the center, will depend upon the muscular conditions of the eye. The patient will tell the operator where the image appears to be, and the latter can then determine the exact muscular condition since he knows upon which meridian or radial line or between which meridians the image is located and hence the direction of displacement, and from the circles between which the image is located the amount of displacement. Also by means of the tangent lines he can determine both the lateral and vertical displacements or deviations. He can then determine whether the muscles of the eyes should be exercised vertically, horizontally or diagonally, and to what extent, or the axes and strength of prisms to be worn to bring relief to the patient.

Although theoretically the test which I describe above is sufficient for determining the muscular condition of both of the eyes I prefer to make the same test with the cobalt glass before the other eye, the second test serving as a check upon the first.

It will be seen that the condition of the eyes can be determined very quickly and accurately since the greatest source of error present with apparatus generally employed is eliminated. Although the markings are based somewhat on prisms these markings can be accurately made from standard prisms the accuracy of which is certain. Furthermore since the readings are made at a considerable distance from the patient there is less chance for error than with the instruments or apparatus in use at the present time. Although the operator must depend upon the statement of the patient in locating the position of the colored image there is little likelihood of any mistake being made in determining its position, for the reason that after the patient tells the operator where the image is located the operator will place a pointer upon the chart and move it about slowly until the patient tells him that the end of the pointer is on the image. This manner of locating the image serves as a check upon the patient's statement.

I do not desire to be confined to the exact details shown but aim in my claims to cover all modifications, which do not involve a departure from the spirit and scope of my invention.

Having described my invention, I claim:

1. In an eye testing apparatus, a chart, means for adjustably supporting the same, said chart having a small centrally located aperture and concentric circles drawn about the aperture as a center, and a source of light at the rear of said chart opposite said aperture.

2. In an eye testing apparatus, a chart having a small centrally located aperture and having on the front face equally spaced radial lines and concentric circles drawn about the aperture as a center and having on the rear side opposite said aperture a source of light.

3. In an apparatus for testing the external muscles of the eye, in combination, means for permitting the eyes to assume a position of rest, and at a definite distance therefrom a chart having a small aperture and at the rear of said aperture a source of light, said chart having on the front face suitable markings for locating the relative positions of images of the aperture, whereby the latent deviation of the muscles of the eyes can be determined.

4. In an apparatus for testing the external muscles of the eyes, in combination with means for permitting the eyes to assume a position of rest, a chart located a fixed distance therefrom, said chart having a small aperture through which rays of light may pass and having on its front surface concentric circles drawn about the aperture as a center, said circles having radii bearing a fixed relation to the distance of the chart from said means for permitting the eyes to assume a position of rest.

5. In an apparatus for testing the external muscles of the eyes, in combination with means for permitting the eyes to assume a position of rest, a chart located a fixed distance therefrom, said chart having a small aperture, a source of light mounted on the rear of the chart opposite said aperture and said chart having on its front surface equally spaced radial lines and concentric circles drawn about the aperture as a center.

6. In an apparatus for testing the external muscles of the eyes, in combination with means for permitting the eyes to assume a position of rest, a chart located a fixed distance therefrom, said chart having a small aperture and a source of light mounted on the rear of the chart opposite said aperture, and said chart having on its front surface equally spaced radial lines and concentric circles drawn about the aperture as a center, the radii of said circle being in terms of light displacement effects produced by standard prisms at the same distance from the chart as said means for permitting the eyes to assume a position of rest.

7. In an apparatus for determining the latent deviations of the external muscles of the eyes, in combination with means for permitting the eyes to assume a position of rest so as to produce a double image effect, a chart located a fixed distance from said means, said chart having a small aperture, a source of light at the rear of said aperture, and having on the front face suitable markings whereby the relative location of the two images of the aperture may be determined.

In testimony whereof I affix my signature in presence of two witnesses.

JAMES E. COGAN.

Witnesses:
A. F. KWIS,
RAE WEISS.